(12) United States Patent
Ro et al.

(10) Patent No.: US 12,397,747 B2
(45) Date of Patent: Aug. 26, 2025

(54) MOBILE DEVICE, A VEHICLE HAVING THE SAME, AND A CONTROL METHOD THEREOF

(71) Applicants: HYUNDAI MOTOR COMPANY, Seoul (KR); KIA CORPORATION, Seoul (KR)

(72) Inventors: Heejin Ro, Seoul (KR); Yocheol Jang, Suwon-si (KR); Sanghyun Hwang, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 149 days.

(21) Appl. No.: 18/215,315

(22) Filed: Jun. 28, 2023

(65) Prior Publication Data
US 2024/0190385 A1    Jun. 13, 2024

(30) Foreign Application Priority Data
Dec. 10, 2022    (KR) .................. 10-2022-0172110

(51) Int. Cl.
| | |
|---|---|
| *B60R 25/30* | (2013.01) |
| *B60R 25/24* | (2013.01) |
| *G07C 9/00* | (2020.01) |

(52) U.S. Cl.
CPC .......... *B60R 25/24* (2013.01); *G07C 9/00309* (2013.01); *B60R 2325/205* (2013.01);
(Continued)

(58) Field of Classification Search
CPC .......... G07C 2009/00555; G07C 2009/00793; G07C 9/00309; G07C 2009/00769;
(Continued)

(56) References Cited

U.S. PATENT DOCUMENTS 11,037,387 B1 *  6/2021  Elangovan ......... G07C 9/00309
2019/0329732 A1 * 10/2019  Hocke .................... B60R 25/245
(Continued)

FOREIGN PATENT DOCUMENTS

| CN | 111246423 A | 6/2020 |
|---|---|---|
| JP | 2012036582 A | 2/2012 |

(Continued)

*Primary Examiner* — Dionne Pendleton
(74) *Attorney, Agent, or Firm* — Lempia Summerfield Katz LLC

(57) ABSTRACT

A vehicle may receive channel hopping information and a time stamp of a data area of a packet from a communicator; broadcast the packet as information of an advertising signal through any one of a plurality of preset channels; in response to the information of the advertising signal being identical to information of a response signal of a mobile device received through the communicator, determine as a relay attack detection and control deactivation of a digital key; in response to the information of the advertising signal being different from the information of the response signal of the mobile device, confirm a channel through which the information of the response signal is received; and in response to the confirmed channel being identical to the any one channel, control activation of the digital key.

15 Claims, 8 Drawing Sheets

(52) U.S. Cl.
CPC .............. *G07C 2009/00555* (2013.01); *G07C 2009/00793* (2013.01)

(58) Field of Classification Search
CPC ...... G07C 2209/63; G07C 2009/00261; G07C 2009/00801; G07C 9/00174; G07C 9/00182; G07C 2009/00388; G07C 9/20; G07C 2009/00357; G07C 2009/00396; G07C 2209/08; G07C 2209/61; G07C 9/00944; G07C 9/28; B60R 2325/205; B60R 25/24; B60R 25/2072; B60R 25/102; B60R 25/245; B60R 2325/105; B60R 2325/108; B60R 25/209; B60R 25/241; B60R 25/246; H01Q 1/3241; H01Q 1/3275; H01Q 13/10; H01Q 25/00; H01Q 25/04; H01Q 9/0435; H01Q 9/0464; H01Q 9/42; G01S 11/02; G01S 13/765; G01S 13/767; G01S 13/84; G01S 2205/01; G01S 5/0205; G01S 5/0284; G01S 7/021; H04K 2203/16; H04K 2203/18; H04K 2203/22; H04K 3/28; H04K 3/42; H04K 3/43; H04K 3/45; H04K 3/65; H04K 3/825; A61B 3/0041; A61B 3/022; A61B 3/024; A61B 3/032; A61B 3/113; A61B 5/398; A61B 5/4863; H04B 17/318; H04B 1/7073; H04B 7/0669; H04B 7/0691; H04B 7/10; H04B 7/15; F02N 11/0807; H04L 63/1466; H04L 63/0853; H04W 12/08; H04W 12/082; H04W 12/12; H04W 4/80; H04W 12/122; H04W 12/128; H04W 12/64; H04W 4/023; H04W 4/40; H04W 12/06; H04W 84/12

See application file for complete search history.

(56) References Cited

U.S. PATENT DOCUMENTS

2020/0254968 A1\* 8/2020 Hassani ............... H04B 17/318
2021/0366213 A1 11/2021 Hadaschik et al.

FOREIGN PATENT DOCUMENTS

KR 101783151 B1 9/2017
KR 20200003502 A 1/2020

\* cited by examiner

MOBILE DEVICE, A VEHICLE HAVING THE SAME, AND A CONTROL METHOD THEREOF

CROSS-REFERENCE TO RELATED APPLICATION

This application claims priority to Korean Patent Application No. 10-2022-0172110, filed on Dec. 10, 2022 in the Korean Intellectual Property Office, the disclosure of which is incorporated herein by reference.

TECHNICAL FIELD

The disclosure relates to a mobile device to enhance security of a digital key, a vehicle having the same, and a control method thereof.

BACKGROUND

The statements in this section merely provide background information related to the present disclosure and may not constitute prior art.

Vehicles may be started or stopped and be locked or unlocked with a key or a remote controller.

By performing two-way communication with a vehicle, when a driver is close to the vehicle, a remote controller allows vehicle doors or trunk to be automatically opened or closed, or the vehicle starts without driver's manual operation.

Recently, due to the development of control technologies enabling communication between a vehicle and a mobile device, a user is able to control opening/closing and locking/unlocking of doors and starting the vehicle using a mobile device.

Vehicles whose door opening/closing and locking/unlocking are controlled by communication with a mobile device may indirectly perform communication with the mobile device by a repeater that relays the communication. As a result, vehicle theft can occur.

For example, even though a user's mobile device is located in a remote place, a vehicle may incorrectly determine that the vehicle is close to the user's mobile device due to a relay attack. This attack involves retransmitting an RF-level signal to the vehicle using a Bluetooth low energy (BLE) broadcasting method. As a result, hackers are able to steal vehicles.

SUMMARY

An aspect of the disclosure provides a vehicle and a control method for the vehicle, which may record vehicle identification information, time stamp, channel hopping information in a data area. The present disclosure may broadcast a Bluetooth packet through a preset channel and detect a relay attack based on a received response signal.

Another aspect of the disclosure provides a vehicle and a vehicle control method that may confirm a channel based on channel hopping information, may receive data through the confirmed channel, and may determine validity of the data based on time stamp.

Still another aspect of the disclosure provides a mobile device that may confirm a channel based on received channel hopping information and may transmit data and a response signal through the confirmed channel.

Additional aspects of the disclosure are, in part, set forth in the description which follows and should be, in part, apparent from the description or may be learned by practice of the disclosure.

According to an aspect of the disclosure, a vehicle includes a communicator configured to communicate with a mobile device storing a digital key; a memory configured to store identification information of the mobile device, identification information of the vehicle, and the digital key; and a processor. The processor is configured to broadcast a packet as an advertising signal through any one of a plurality of preset channels. The processor is also configured to, in response to information of the advertising signal being identical to information of a response signal received through the communicator, determine as a relay attack detection and control deactivation of the digital key. The processor is also configured to, in response to the information of the advertising signal being different from the information of the response signal received through the communicator, confirm a channel through which the information of the response signal is received. The processor is also configured to, in response to the confirmed channel being identical to the any one channel, control activation of the digital key.

The processor of the vehicle according to an aspect of the disclosure is configured to confirm a number of times that the information of the response signal identical to the information of the advertising signal is received. The processor of the vehicle is configured to, in response to the confirmed number of times being a preset number of times, determine as the relay attack detection.

The processor of the vehicle according to an aspect of the disclosure is configured to transmit a relay attack detection event to the mobile device, in response to determining as the relay attack detection.

The processor of the vehicle according to an aspect of the disclosure is configured to control the activation of the digital key, in response to receiving an anti-theft release command through an application of the mobile device, with the digital key deactivated.

The vehicle according to an aspect of the disclosure further includes at least one electronic device. The processor of the vehicle according to an aspect of the disclosure is configured to control an operation of the at least one electronic device, based on a control command received through the mobile device, with the digital key activated.

The communicator of the vehicle according to an aspect of the disclosure is configured to transmit channel hopping information and a time stamp of a data area of the packet to the processor, before the broadcasting.

In response to the confirmed channel being identical to the any one channel, the processor of the vehicle according to an aspect of the disclosure is configured to determine whether the information of the response signal is received within a preset period of time based on the time stamp. Based on a determination that the information of the response signal is received within the preset period of time, the processor is configured to control the activation of the digital key.

The communicator of the vehicle according to an aspect of the disclosure is configured to transmit channel hopping information, a time stamp of a data area of the packet, signal count data, and the identification information of the vehicle to the processor, before the broadcasting.

According to another aspect of the disclosure, a control method of a vehicle includes receiving channel hopping information and a time stamp of a data area of a packet from a communicator. The control method of the vehicle also includes broadcasting the packet as an advertising signal through any one of a plurality of preset channels. The control method of the vehicle also includes in response to information of the advertising signal being identical to information of a response signal of a mobile device received through the communicator, determining as a relay attack detection. The control method of the vehicle also includes controlling deactivation of a digital key in response to determining as the relay attack detection. The control method of the vehicle also includes in response to the information of the advertising signal being different from the information of the response signal of the mobile device, confirming a channel through which the information of the response signal is received. The control method of the vehicle also includes in response to the confirmed channel being identical to the any one channel, controlling activation of the digital key.

The determining as the relay attack detection includes confirming a number of times that the information of the response signal identical to the information of the advertising signal is received and includes in response to the confirmed number of times being a preset number of times, determining as the relay attack detection.

The control method according to another aspect of the disclosure further includes transmitting a relay attack detection event to the mobile device, in response to determining as the relay attack detection.

The control method according to another aspect of the disclosure further includes, in response to receiving an anti-theft release command through an application of the mobile device, with the digital key deactivated, controlling the activation of the digital key.

The control method according to another aspect of the disclosure further includes controlling an operation of at least one electronic device based on a control command received through the mobile device, with the digital key activated.

The controlling of the activation of the digital key includes in response to the confirmed channel being identical to the any one channel, determining whether the information of the response signal is received within a preset period of time based on the time stamp and includes based on a determination that the information of the response signal is received within the preset period of time, controlling the activation of the digital key.

Signal count data of the data area of the packet and identification information of the vehicle are further received, before the broadcasting.

According to still another aspect of the disclosure, a mobile device includes: a display device; a memory configured to store identification information of a vehicle and a digital key; a communicator configured to communicate with the vehicle; and a processor. The processor is configured to, in response to receiving information of an advertising signal through any one of a plurality of preset channels, confirm a packet in the received information of the advertising signal. The processor is configured to confirm channel hopping information and identification information of the vehicle of a data area of the packet. The processor is configured to, in response to the confirmed identification information of the vehicle being identical to the identification information of the vehicle stored in the memory, transmit information of a response signal through the any one channel. The processor is configured to, in response to receiving a communication connection signal form the vehicle, control the display device to display communication connection information.

The mobile device according to still another aspect of the disclosure further includes an input device. The processor of the mobile device according to still another aspect of the disclosure is configured to transmit, to the vehicle, a control command corresponding to a user input received through the input device upon communication connection with the vehicle.

The communicator of the mobile device according to still another aspect of the disclosure is configured to perform Bluetooth communication, and the plurality of preset channels includes a channel 37, a channel 38, and a channel 39.

In response to receiving a relay attack detection event from the vehicle, the processor of the mobile device according to still another aspect of the disclosure is configured to control the display device to display the received relay attack detection event.

The mobile device according to still another aspect of the disclosure further includes an input device. The processor of the mobile device according to still another aspect of the disclosure is configured to control execution of an application in response to receiving an execution command of the application through the input device. The processor of the mobile device is configured to, in response to receiving an anti-theft release command through the input device during execution of the application, transmit the received anti-theft release command to the vehicle.

BRIEF DESCRIPTION OF THE DRAWINGS

These and/or other aspects of the disclosure should become apparent and more readily appreciated from the following description of the embodiments, taken in conjunction with the accompanying drawings of which.

DETAILED DESCRIPTION

Figure 1:
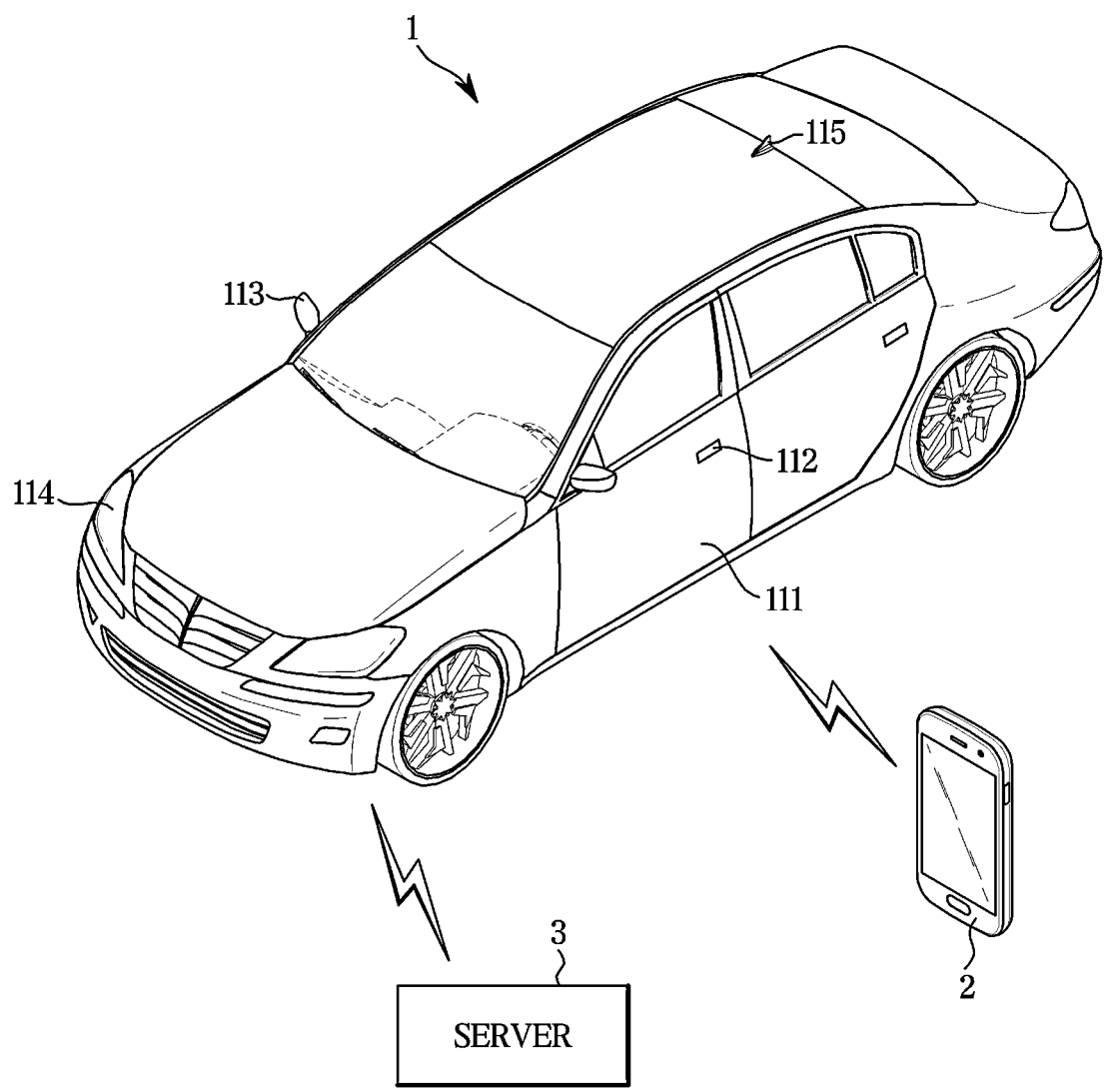
FIG. 1 is a diagram illustrating an example of communication of a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted. The terms such as "~part", "~module", and the like may refer to at least one process processed by at least one hardware or software. According to embodiments, a plurality of "~parts", "~modules" may be embodied as a single element, or a single of a "~part", "~module" may include a plurality of elements. When the "~part", "~module", or the like of the present disclosure is described as having a purpose or performing an operation, function, or the like, the component, device, element, or the like should be considered herein as being "configured to" meet that purpose or to perform that operation or function. Each of the "~part", "~module", and the like may separately embody or be included with a processor and a memory, such as a non-transitory computer readable media, as part of the apparatus.

It should be understood that when an element is referred to as being "connected" to another element, the element can be directly or indirectly connected to the other element, wherein the indirect connection includes "connection" via a wireless communication network.

It should be understood that the term "include," when used in the present disclosure, specifies the presence of stated features, integers, steps, operations, elements, and/or components but does not preclude the presence or addition of at least one other features, integers, steps, operations, elements, components, and/or groups thereof.

It should be understood that, although the terms first, second, etc. may be used herein to describe various elements, these elements should not be limited by these terms.

It should be understood that the singular forms are intended to include the plural forms as well, unless the context clearly dictates otherwise.

Reference numerals used for method steps are just used for convenience of explanation but are not intended to limit an order of the steps. Thus, unless the context clearly dictates otherwise, the written order may be practiced otherwise.

Hereinafter, an operation principle and embodiments are described in detail with reference to the accompanying drawings.

FIG. 1 is a diagram illustrating an example of communication of a vehicle according to an embodiment.

A vehicle 1 may communicate with a first mobile device 2 and a server 3 and also communicate with a second mobile device.

The vehicle 1 includes a vehicle body having an exterior and an interior and includes a chassis where mechanical devices for driving are installed as a remaining portion except for the vehicle body.

The exterior of the vehicle body includes a front panel, a bonnet, a roof panel, a rear panel, a tailgate for opening and closing a trunk where luggage is loaded, a plurality of doors 111, and a window glass provided to each of the doors to be able to be opened and closed.

A handle 112 that may be gripped by a user may be provided on each of front, back, left and right sides of the vehicle to facilitate opening and closing the door. The handle 112 may be protruded from a surface of the door 111. Also, the handle 112 may be provided to be retracted and to be drawn out of the door 111.

The handle 112 may be provided with an operation member (not shown) for receiving locking and unlocking release commands of a user. The operation member of the handle 112 may be provided in various types such as a switch type, a button type, a touch type, a lever type, and the like.

The vehicle 1 may further include a locking member for locking and unlocking the door 111 and may further include an opening/closing member for opening and closing the door 111.

The opening/closing member and the locking member may allow the door to be coupled to or be separated from the vehicle body and may allow the door to be locked or unlocked to the vehicle body, respectively.

The locking member and the opening/closing member may be implemented as a single assembly.

The locking member and the opening/closing member may be implemented as separate assemblies.

The locking member and the opening/closing member may be operated by manipulating the handle 112.

The exterior of the vehicle 1 includes side mirrors 113 for providing a driver with a rear field of view and includes a plurality of lamps 114 allowing the driver to see surrounding information of the vehicle more easily while the driver looks at a front view.

The side mirrors 113 may be folded or unfolded in response to vehicle ON/OFF operations. The plurality of lamps 114 may function as lighting as well as a signal or communication with another vehicle and a pedestrian.

The vehicle 1 may further include an antenna 115 for communication with the first mobile device 2 and the server 3.

The antenna 115 may be provided on a roof panel, a rear windshield glass, the door 111, or one of a front panel or a rear panel.

The interior of the vehicle body includes a seat provided for an occupant to sit on, a dashboard, a cluster, and a center fascia on which a control panel of air conditioner is disposed. Here, the cluster is provided on the dashboard and displays driving functions and vehicle information, such as a vehicle speed, engine speed, refueling amount coolant, and the like.

The seat refers to a chair provided for an occupant to sit comfortably inside the vehicle and may include a driver's seat, a passenger's seat, and a rear seat located behind the driver's seat and the passenger's seat.

The vehicle 1 may further include an audio device, an air conditioner, a Bluetooth device, and a seat heater for user convenience.

The vehicle 1 may perform communication with a remote controller. When the remote controller is located inside the vehicle or authentication of the remote controller or the first mobile device 2 is completed via wireless communication network, the vehicle 1 may transmit and receive information with the remote controller or the first mobile device 2.

The interior of the vehicle may further include a start button for receiving a vehicle ON/OFF command. The interior of the vehicle may further include the vehicle start module that controls starting of the vehicle in response to turning on or off the start button.

When the vehicle is an internal combustion engine vehicle, the vehicle start module may include an ignition motor and an engine.

When the vehicle is an electric vehicle, the vehicle start module may include a drive motor.

When the start button is pressed by a user after authentication of the remote controller or the first mobile device 2 is completed, the vehicle may operate the vehicle start module.

After the authentication of the first mobile device 2 is completed, the vehicle 1 may control to unfold the side mirrors 113 or turn on or off at least one of the plurality of lamps 114.

After the authentication of the first mobile device 2 is completed, the vehicle 1 may adjust a seat position or control an operation of the air conditioner or seat heater based on user information of the first mobile device 2.

The vehicle 1 may further include a first communicator 123 (refer to FIG. 2) for transmitting and receiving information with at least one of the first mobile device 2, the server 3, or the remote controller (e.g., a fob key, or a card key), which are external devices.

The first communicator 123 may include at least one constituent component enabling communication among constituent components of the vehicle 1, for example, at least one of a short-range communication module, wireless communication module, or a wired communication module.

The short-range communication module may include a variety of short-range communication modules that transmit and receive signals in a short distance using a wireless communication network, such as a Bluetooth module, infrared communication module, radio frequency identification (RFID) communication module, wireless local access network (WLAN) communication module, near-field communication (NFC) communication module, Zigbee communication module, and the like.

The wired communication module may include various wired communication modules, such as a controller area network (CAN) communication module, local area network (LAN) module, wide area network (WAN) module, value added network (VAN) module, or the like and may also include various cable communication modules, such as a universal serial bus (USB), high definition multimedia interface (HDMI), digital visual interface (DVI), recommended standard 232 (RS-232), power line communication, plain old telephone service (POTS), or the like.

The wired communication module may further include a local interconnect network (LIN).

The wireless communication module may include wireless communication modules that support a variety of wireless communication methods such as a global system for mobile communication (GSM), code division multiple access (CDMA), wideband CDMA (WCDMA), universal mobile telecommunications system (UMTS), time division multiple access (TDMA), long term evolution (LTE), and the like, in addition to a Wi-Fi module and a Wibro module.

The first mobile device 2 may communicate with the vehicle 1.

The first mobile device 2 may be a mobile device owned by a user having a control right to the vehicle 1.

The first mobile device 2 may download, set up, and execute an application for controlling the vehicle 1.

The application may be for using a remote service of the vehicle.

The application may be for transmitting and receiving an anti-theft release command.

The first mobile device 2 may display an image corresponding to execution of the application.

The first mobile device 2 may proceed with membership registration when the application is initially executed and may transmit user registration information corresponding to the membership registration and identification information of the first mobile device 2 to the vehicle 1 or the server 3.

The first mobile device 2 may generate and store a digital key capable of controlling the vehicle 1 in response to the user registration on the application and may transmit the digital key to the vehicle 1 or the server 3. In this case, the vehicle 1 and the server 3 may store the user registration information, the identification information of the first mobile device 2, and the digital key as information for controlling the vehicle 1.

The first mobile device 2 may perform user authentication during execution of the application for controlling the vehicle.

The first mobile device 2 may receive a user input during execution of the application for controlling the vehicle.

The user input may include at least one of lock and unlock commands of the door 111, lock and unlock commands of tailgate, a vehicle ON command, or a turn-on command of the lamps 114.

The first mobile device 2 transmits information corresponding to a command received by the user input to the vehicle 1. The first mobile device 2 may transmit information corresponding to the received command to the vehicle 1 as a communication signal.

The first mobile device 2 may be implemented with a computer or a portable terminal capable of communicatively accessing the vehicle 1 through a network.

Here, the computer may include, for example, a laptop, a desktop, a tablet personal computer (PC), a slate PC, and the like, equipped with a web browser. The portable terminal may include, for example, all kinds of handheld-based wireless communication devices that guarantee portability and mobility, such as a personal communication system (PCS), a global system for mobile communication (GSM), a personal digital cellular (PDC), a personal handyphone system (PHS), a personal digital assistant (PDA), an international mobile telecommunication (IMT)-2000, a code division multiple access (CDMA)-2000, a wideband CDMA (WCDMA), a wireless broadband Internet (WiBro) terminal, and a smartphone, and a wearable device such as a watch, ring, bracelet, anklet, necklace, eyeglasses, contact lenses, or head-mounted-device (HMD), and the like.

The first mobile device 2 according to the embodiment may perform communication with the vehicle using a Bluetooth low energy (BLE) communication method. The mobile device 2 may perform communication by Bluetooth beacon protocol (iBeacon).

The server 3 may communicate with the vehicle 1 and the first mobile device 2.

The server 3 may receive and store identification information of the vehicle 1 and user registration information of the vehicle and may store the identification information of the first mobile device 2, and also receive information of the first mobile device 2 by linking to the first mobile device 2.

The user registration information may include identification information or biometric information of a user registered in the server 3 and may include identification information of the first mobile device 2 owned by a registered user.

Also, the user registration information may include a name, an address, an email address, a resident registration number, a birth date, driving license information, and the like, of a user registered in the server 3.

Here, the identification information of the user registered in the server 3, the identification information of the first mobile device 2, and the like may be registered through an application installed on the vehicle or the first mobile device 2.

The identification information of the first mobile device 2 is unique identification information of the first mobile device 2, which is distinguished from other mobile devices, and may include at least one of a phone number, Wi-Fi MAC address, a serial number, or an international mobile equipment identity (IMEI) of the first mobile device 2.

The identification information of the first mobile device 2 may also include a Bluetooth identification information (BTID).

The identification information of the vehicle may include information about vehicle model, vehicle class, license plate, power generation method (e.g., hybrid, electric, internal combustion engine, hydrogen, etc.), shift method, and the like.

The server 3 may provide a remote service between the vehicle 1 and the first mobile device 2.

The remote service refers to a service providing a user with information, received through the server 3, via the vehicle, providing the first mobile device 2 with operation information of the vehicle 1 and a user input received in the vehicle 1, and controlling the vehicle 1 based on a user input received through the first mobile device 2.

In other words, the server 3 may allow the user to control starting of the vehicle through the first mobile device 2, based on information about the digital key received through the first mobile device 2.

The server 3 may be a server provided in a service center, a manufacturing company, a repair shop, and the like, related to the vehicle 1. The server 2 may also be a server of an application (i.e., app) providing a service associated with the vehicle 1, and a telematics server or platform server.

Figure 2:
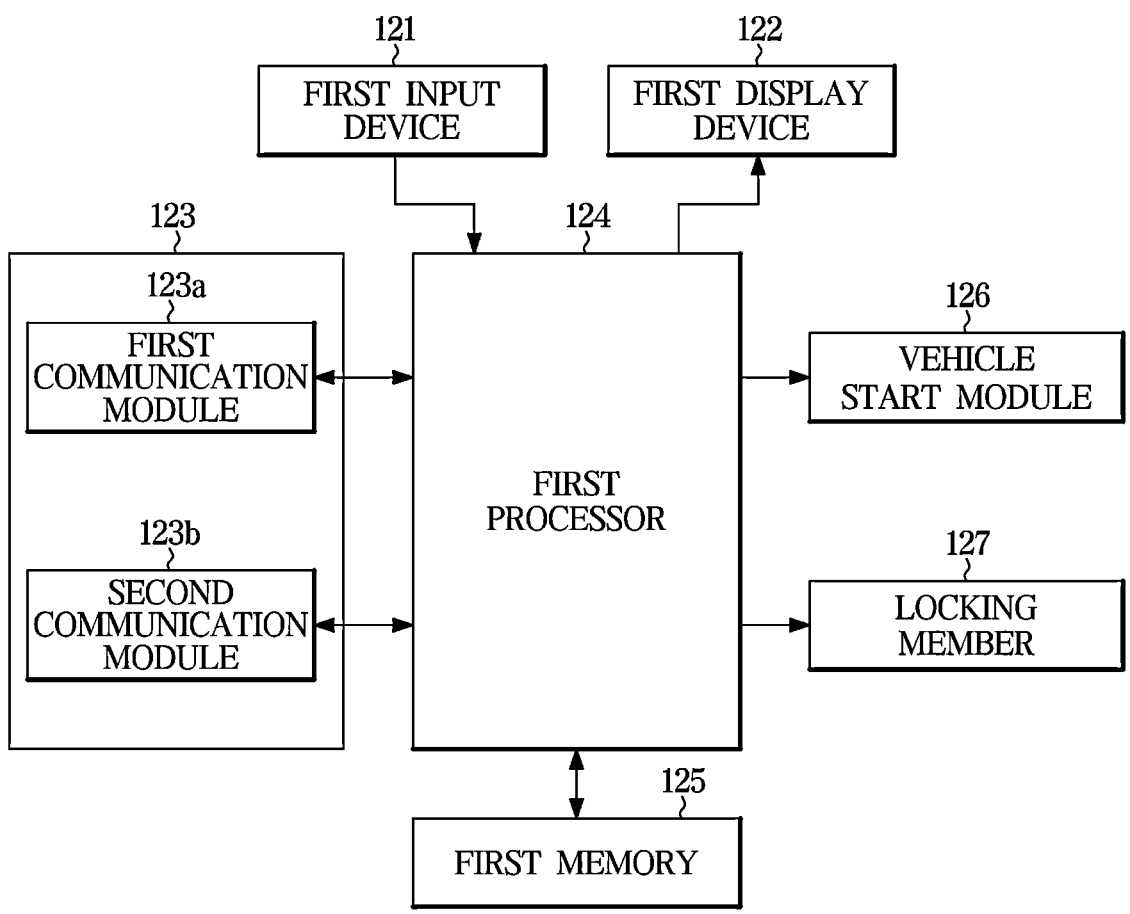
FIG. 2 is a control block diagram illustrating a configuration of a vehicle according to an embodiment.

FIG. 2 is a control block diagram illustrating a configuration of a vehicle according to an embodiment, which is described with reference to FIG. 3-FIG. 6.

To differentiate constituent components of the vehicle 1 from those of the mobile device 2, the constituent components of the vehicle are referred to as "first" component and the constituent components of the first mobile device are referred to as "second" component.

The vehicle 1 includes a first input device 121, a first display device 122, a first communicator 123, a first processor 124, a first memory 125, a vehicle start module 126, and a locking member 127.

The first input device 121 receives a variety of operation commands performable in the vehicle 1.

The first input device 121 may receive a user input.

The first input device 121 may receive lock and unlock commands of the door 111 as user input.

The first input device 121 may receive a registration command of the first mobile device 2 as user input.

The first input device 121 may receive identification information of the first mobile device 2 as user input and may receive authentication information for registration of the first mobile device 2.

The authentication information for registration of the first mobile device 2 may be authentication information transmitted from the vehicle to the first mobile device 2. Here, the first mobile device 2 registered in the vehicle may perform a function of a digital key of the vehicle.

The first input device 121 may also receive identification information of a user. The identification information of the user may be registration information of the user for controlling the vehicle.

The first input device 121 may receive a vehicle ON command for driving a drive motor or for engine start and may include a start button that receives a vehicle OFF command from the user when parking.

The first display device 122 displays information about a function being performed in the vehicle and information input by the user.

The first display device 122 may display information about registration processes of the first mobile device 2 as an image and may display registration success information or registration failure information of the first mobile device 2 as a result of registration as an image.

The first display device 122 may also display the identification information of the first mobile device 2 completely registered.

When attempting communication with the first mobile device 2, the first display device 122 may display information about authentication processes with the first mobile device 2 and may display authentication success information or authentication failure information of the first mobile device 2 as a result of authentication.

The first display device 122 may display identification information of the first mobile device 2 successfully authenticated.

Here, the first input device 121 and the first display device 122 may be implemented as a touch screen. Also, the first input device 121 and the first display device 122 may be provided as an input device and a display device of an audio, video, and navigation (AVN) device.

The first communicator 123 may include at least one constituent component enabling communication between an external device and the constituent components of the vehicle, for example, at least one of a short-range communication module, wireless communication module, or a wired communication module. Here, the external device may be a remote controller, the first mobile device, the server, and a second mobile device.

The first communicator 123 may transmit information received from the external device to the first processor 124 and may transmit information corresponding to a control command of the first processor 124 to the external device.

The first communicator 123 may include a first communication module 123A and a second communication module 123B performing communication in different communication methods.

The first communication module 123A may be a Bluetooth module.

The first communication module 123A performs communication with the first mobile device 2.

The first communication module 123A may perform Bluetooth communication with the first mobile device 2 functioning as the digital key.

Here, performing Bluetooth communication includes performing communication with the first communication module 123A using at least one of a broadcasting method or a connection method.

Here, the broadcasting method is a communication method (connectionless communication method) that periodically transmits an advertising signal notifying a presence of vehicle to nearby mobile devices without establishing a communication connection with the first mobile device 2. In the above process, the vehicle may transmit identification information of the vehicle.

In the broadcasting method, the amount of data to be transmitted may be less than or equal to a preset byte. In other words, the broadcasting method is used when a small amount of data requires to be periodically transmitted to various mobile devices.

The connection method is used when transmitting the amount of data exceeding a preset byte or when using a bi-directional communication. The connection method is safer than the broadcasting method, because data is transmitted after one-to-one connection between the vehicle and the first mobile device. Here, information transmitted from the first mobile device 2 may include command information for controlling an operation of at least one of a plurality of electronic devices provided in the vehicle.

The first mobile device 2 may transmit an advertising signal to notify a presence of the first mobile device 2 as well.

The first communication module 123A transmits a beacon packet to the first mobile device 2 in response to a control command of the first processor 124 and transmits an advertising signal to the first mobile device 2 in response to a control command of the first processor 124.

When information is received from the first mobile device 2, the first communication module 123A transmits the received information of the first mobile device 2 to the first processor 124.

The first communication module 123A may transmit a channel for broadcasting and information about data in a packet to the first processor 124.

The information about data in the packet may include signal count data, time stamp, and vehicle identification number.

The second communication module 123B may be a communication module performing communication in different communication method from a Bluetooth module. For example, the second communication module 123B may be a Wi-Fi communication module.

When a registration command for registration of the first mobile device 2 is received through the first input device 121, the first processor 124 may search for a communicable first mobile device 2 and may transmit authentication information for authentication to the retrieved first mobile device 2.

When the authentication information is received through the first input device 121, the first processor 124 may compare the received authentication information and the transmitted authentication information, and when the received authentication information and the transmitted authentication information are identical to each other, the first processor 124 may register the retrieved first mobile device 2 as the first mobile device 2 for functioning as the digital key.

The first processor 124 may control the first memory 125 to store identification information of the retrieved first mobile device 2 and may control the first display device 122 to display identification information of the first mobile device 2 registered.

The first processor 124 may control the first memory 125 to store identification information of the first mobile device 2 received through the server 3 and may control the first display device 122 to display the identification information of the first mobile device 2 received through the server 3. In other words, the first processor 124 may receive the identification information of the first mobile device 2 for functioning as the digital key, from the server 3.

When registering the first mobile device 2 functioning as the digital key, the first processor 124 transmits, to the first mobile device 2, a beacon packet for authentication of the first mobile device 2 and communication connection with the first mobile device 2.

Figure 3:
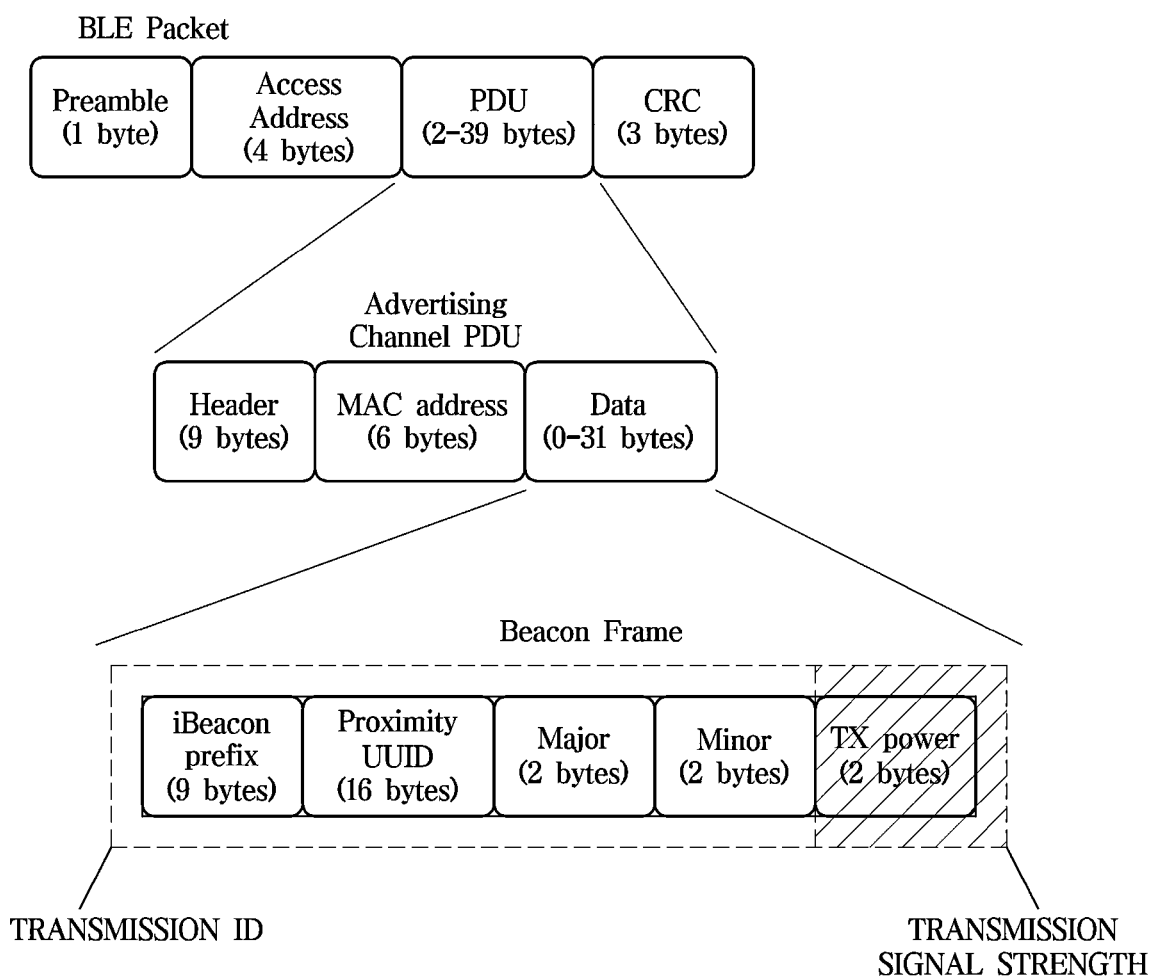
FIG. 3 is a diagram illustrating an example of a structure of a beacon packet of a vehicle according to an embodiment.

As shown in FIG. 3, a Bluetooth packet (also referred to as a packet or a beacon packet) includes a preamble field for synchronizing transmission timing between two or more devices, an access address field having an address for communication connection in a link layer, a protocol data unit (PDU) field having information about the total amount of data transmitted and received between the same communication connection layers, and a cyclic redundancy check (CRC) field including a method of determining a check value for checking whether an error exists in transmitted data during data transmission.

An advertising data protocol broadcast in an iBeacon protocol is described as an example.

The PDU field is an advertising channel PDU field and includes a header field, a MAC address field, and a data field. Here, the header field is for identifying and controlling data in front of set of data so that contents and characteristics of data may be identified, and the MAC address field includes unique numbers of devices used in a network such as LAN cards, modems, terminals, and the like.

Also, the data field includes an iBeacon prefix field, a proximity universal unique identifier (UUID) field, a major field, a minor field, and a transmission power (TX power) field.

Here, the iBeacon prefix field is a part where beacon settings or characteristic values are recorded, and the iBeacon prefix field may include information about an advertising flag, advertising header, company identifier (ID) and beacon length.

The iBeacon prefix field indicates whether a vehicle uses a beacon protocol.

The proximity UUID field includes unique identification information (ID) of a device or product.

The proximity UUID field is used to prove identification information of the vehicle, such as a manufacturer name of the vehicle.

The major field includes identification information (ID) of a service group or region. For example, the major field is used to distinguish a large space where the vehicle is used.

Identification information (ID) of the minor field includes information for distinguishing nodes within the same region. For example, the minor field is used to distinguish a small space where the vehicle is used and individual vehicles.

The TX Power field includes a power level when the vehicle transmits a signal.

Accordingly, a signal strength may be identified when the first mobile device 2 receives a signal. In other words, the first mobile device 2 may obtain the amount of decrease in strength by comparing a reception signal strength and a transmission signal strength corresponding to a power level and may obtain a distance to the vehicle based on the obtained amount of decrease.

When receiving a signal from the first mobile device 2, the vehicle may identify a reception signal strength and thus may obtain a distance to the first mobile device 2.

Figure 4:
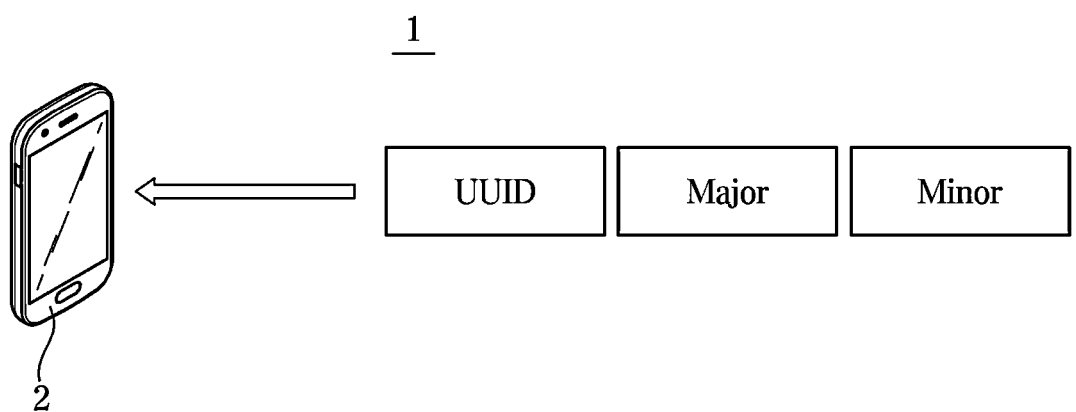
FIG. 4 is a diagram illustrating an example of a data field transmitted to a first mobile device from a vehicle according to an embodiment.

As shown in FIG. 4, when the first mobile device 2 is completely registered, the first processor 124 may transmit, to the first mobile device 2, information about a UUID field included in data of a beacon packet, a major field, and a minor field, as information for communication connection with the completely registered first mobile device 2.

The first processor 124 may transmit the beacon packet, when communication with the first mobile device 2 functioning as a digital key is attempted.

When attempting communication with the first mobile device 2, the first processor 124 may periodically transmit an advertising signal using the first communication module 123A in the broadcasting method.

The advertising signal may include packet information about a packet signal where packet is converted into a digital signal. Also, the advertising signal may include a signal of a digital key.

The first processor 124 may convert the beacon packet into a digital signal and may broadcast the converted digital signal which is the packet information as information of the advertising signal.

In this instance, the advertising signal transmitted from the vehicle 1 may be received in the first mobile device 2 as well as at least one second mobile device.

The at least one second mobile device may transmit the received advertising signal to the first mobile device 2 and may receive a signal transmitted from the first mobile device 2.

Before transmitting the advertising signal in the broadcasting method, the first processor 124 may receive channel hopping information and time stamp to be used when broadcasting from the first communication module 123A.

The channel hopping information and the time stamp may be information recorded in a data area in the beacon packet and be unique data.

The first processor 124 may further receive signal count data and vehicle identification number (VIN) from the first communication module 123A.

The signal count data and the VIN may be information recorded in a data area in the beacon packet.

The first processor 124 may generate count data of a signal each time an advertising signal is periodically transmitted.

The at least one second mobile device, which is not a mobile device of a user, may be a mobile device of a hacker associated with relay attack.

The at least one second mobile device may receive an advertising signal transmitted from the vehicle and may transmit, to the vehicle 1 and the first mobile device 2, a signal in the Bluetooth broadcasting method corresponding to the advertising signal received for hacking the vehicle.

The first processor 124 may detect a relay attack based on information of a received response signal. Here, the information of response signal may include information about a digital key signal.

More specifically, when the information of response signal in the broadcasting method is received, the first processor 124 determines whether the received information of response signal in the broadcasting method is identical to information of advertising signal in the broadcasting method transmitted from the vehicle. When it is determined that the received information of response signal in the broadcasting method is identical to the information of the advertising signal in the broadcasting method transmitted from the vehicle, the first processor 124 determines as a relay attack detection.

When it is determined that the received response signal in the broadcasting method is identical to the advertising signal in the broadcasting method transmitted from the vehicle, the first processor 124 may confirm the number of times that the same response signal in the broadcasting method is received, may determine whether the confirmed number of times is greater than or equal to a preset number of times, and when it is determined that the confirmed number of times is greater than or equal to the preset number of times, may determine as the relay attack detection. Here, the preset number of times may be three times.

When the relay attack detection is determined, the first processor 124 may deactivate the digital key and may block a transfer of control right to control the vehicle using the digital key.

When the relay attack detection is determined, the first processor 124 transmits a relay attack detection event to the first mobile device 2 through the server 3.

When an anti-theft release command is received through an application for anti-theft release installed in the first mobile device 2 after determining as the relay attack detection, the first processor 124 may activate the digital key, and transfer the vehicle control right to the first mobile device 2 and thus may allow the vehicle to be controlled by using the first mobile device 2.

The first processor 124 may control operations of electronic devices inside the vehicle based on a command received from the first mobile device.

The first processor 124 may detect a relay attack through the second communication module using the first communication module. Here, the second communication module may be an intermediate medium for hacking.

Figure 5:
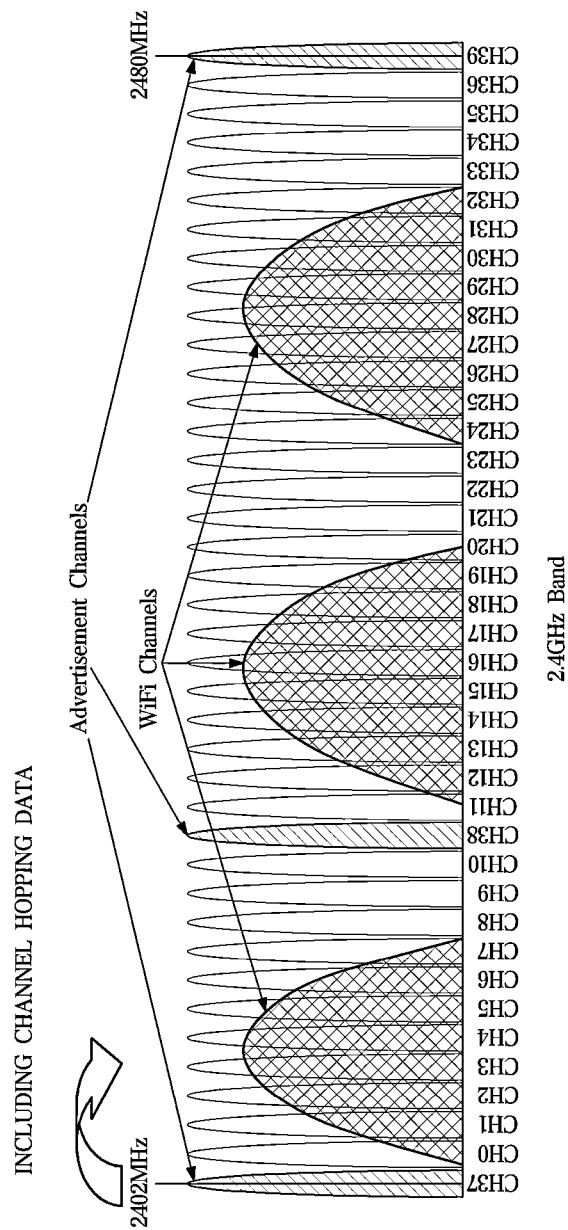
FIG. 5 is a diagram illustrating an example of a channel of a first communication module of a vehicle according to an embodiment.

As shown in FIG. 5, when transmitting an advertising signal in the broadcasting method, the first processor 124 may only use a predetermined channel. Here, the predetermined channel may include three channels, i.e., a channel 37 (37 ch), a channel 38 (38 ch) and a channel 39 (39 ch).

The first processor 124 may perform hopping to avoid interference of neighboring channels by skipping a heavily congested channel and performing communication on another channel.

When transmitting an advertising signal in the broadcasting method for communication connection with the first mobile device 2, the first processor 124 may include channel hopping information for response of the first mobile device in a data area of a beacon packet.

In this case, the first mobile device 2 may transmit an advertising signal through only a channel identical to the channel received based on the channel hopping information. The at least one second mobile device may not ascertain the channel hopping information and thus the at least one second mobile device is incapable of responding.

A data parsing protocol where security is applied between the vehicle and the first mobile device is required to receive data of the application.

Even though parsing the data of the beacon packet may be performed, the at least one second mobile device requires approximately 30 msec from receiving the advertising signal to parsing, due to a structure of a Bluetooth protocol stack.

In addition, when a response signal is transmitted to the vehicle after parsing, the vehicle requires approximately 30 msec from receiving the response signal to parsing. In other words, upon communication with the second mobile device, the vehicle requires approximately 60 msec from receiving the response signal after transmission of the advertising signal to parsing.

Figure 6:
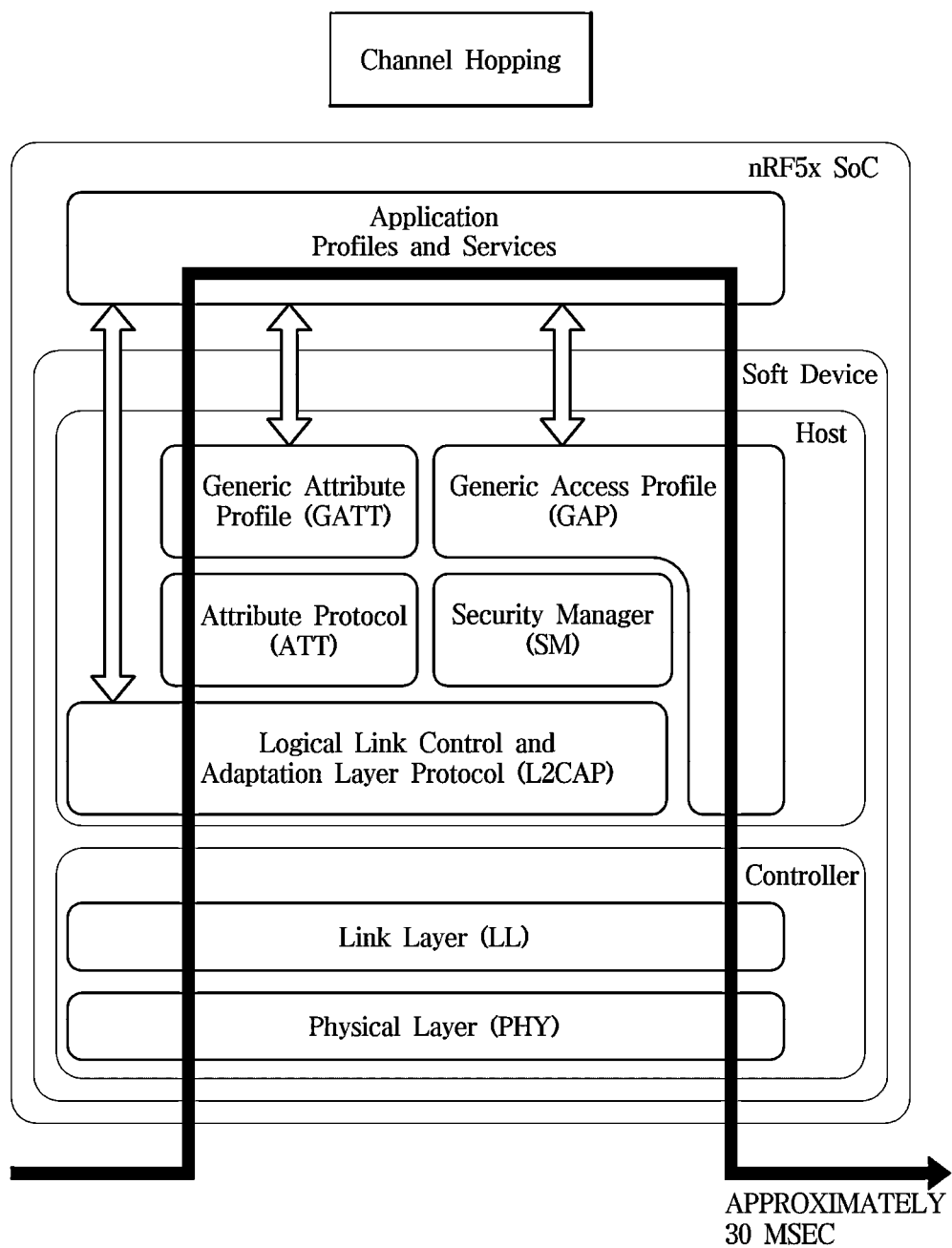
FIG. 6 is a diagram illustrating an example of a Bluetooth protocol stack of a first communication module of a vehicle according to an embodiment.

FIG. 6 is a diagram illustrating an example of a Bluetooth protocol stack (BLE stack) of a first communication module of a vehicle according to an embodiment.

The BLE stack includes functions that a vehicle operating in a low energy (LE) mode defined in Bluetooth core specification is required to have.

The BLE stack may mainly include a controller part, a host part, and an application part.

Each part may have various layers or profiles.

The application part may be a Bluetooth-linked application.

The application part may generate data to be transmitted based on a received beacon packet. The application part may convert a format of the generated data to suit a data format of the vehicle.

Data passing the application part may be transmitted to the first mobile device.

The host part may be a part of a host of a software platform. A plurality of platforms may be loaded on the host part.

A host controller interface (HCI) may be further provided between the host part and the controller part. The HCI may be an interface between a chipset-oriented hardware controller and a host of software platform.

The HCI may be a serial interface type.

The controller part may be a part for the chipset-oriented hardware controller (a combination of hardware and software).

The controller part and the host part may be formed as a single chip.

The controller part may include a physical layer (PHY) and a link layer (LL).

The physical layer may be configured with hardware for transmitting and receiving a radio signal and a radio frequency (RF) system.

The physical layer may manage a Bluetooth transceiver and operate in a Bluetooth frequency band (2.4 GHZ).

The physical layer transmits and receives a signal by dividing a portion of the frequency domain of 2.4 GHz into 40 sections. Here, each frequency domain is referred to as a channel. Each channel has a bandwidth of 2 MHz based on a center frequency. Among the assigned 40 channels, the channel 37, the channel 38 and the channel 39 are used as an advertising channel and the other 37 channels are used as data channels.

The link layer directly interacts with the physical layer and operates between hardware and software.

The link layer is connected to hardware and directly manages a connection with the first mobile device 2. The link layer performs encryption, connection, or channel update.

The link layer may also define data transmission and reception.

For example, scanning is performed in the vehicle, and thus whether the first mobile device capable of being connected through Bluetooth communication exists may be confirmed. The first mobile device may notify a presence of the first mobile device by transmitting an advertising signal.

When connection to the scanned first mobile device is attempted, the link layer enters an initiating state preparing for connection and changes to a connected state when wireless connection is successful.

A logical link control and adaptation layer protocol (L2CAP) is in charge of an interaction between an upper layer (GATT/GAP) and lower layer.

A logical link control and adaptation layer protocol (L2CAP) may include or extract data used in actual applications in packet generated in the link layer.

The L2CAP is a packet-based protocol and supports upper level protocol multiplexing, packet segmentation and reassembly, and transmission of Quality of Service (QOS) information to an upper layer.

A security manager (SM) manages and distributes a security code (key) between the vehicle and the first mobile device.

The SM defines protocols and attributes that manages pairing integrity, authentication, and encryption.

An attribute protocol (ATT) performs data exchange between the vehicle and the first mobile device.

A generic attribute profile (GATT) defines a structure of data exchanged based on ATT and performs a function of service read from ATT.

The GATT may encapsulate an operation of the vehicle by using the ATT.

A generic access profile (GAP) may function as an interface between the vehicle and the first mobile device through pairing and bonding (linker) between the vehicle and the first mobile device.

The GAP is an uppermost layer that manages connection and advertising operations, determines a state of the link layer of the vehicle and the first mobile device, and manages an interaction between the vehicle and the first mobile device.

The GAP performs link management for sharing information with the first mobile device or connecting to the first mobile device in association with the GATT.

In this case, the first mobile device maintains an advertising state in the link layer and waits for a connection request from the vehicle.

In addition, both the first and second mobile devices detected in the vehicle may be in an advertising state.

After transmitting an advertising signal through the Bluetooth communication, the first processor 124 may confirm whether information about a digital key is included in information of a response signal received from the first mobile device 2. When it is determined that the information about the digital key is included in the information of the response signal, the first processor 124 may confirm channel hopping information.

The first processor 124 confirms a channel based on the confirmed channel hopping information.

The first processor 124 determines whether the confirmed channel is identical to a channel used when broadcasting in the vehicle.

When it is determined that the confirmed channel is identical to the channel used when broadcasting in the vehicle, the first processor 124 may receive data transmitted from the first mobile device through the channel used when broadcasting.

The first processor 124 may confirm a time stamp to determine validity of data.

The first processor 124 determines whether the response signal is received within a preset period of time, based on time information of the time stamp and time information about a time that the response signal is received. When it is determined that the response signal is received within the preset period of time, the first processor 124 controls activation of the digital key. When it is determined that the response signal is received after the preset period of time, the first processor 124 controls deactivation of the digital key.

The first processor 124 blocks a transfer of a vehicle control right, when it is determined that the response signal is received after the preset period of time.

Here, the preset period of time may be approximately 50 msec.

As described above, according to the disclosure, a user may easily access the vehicle only with the first mobile device 2 in which the digital key is installed, without a remote controller, and a 'smart walk away' function may be used. In this case, an application installed on the first mobile device 2 is not required to be executed.

In other words, a user may take over a vehicle control right only by possessing the first mobile device storing the digital key.

According to the disclosure, even when a relay attack is attempted through a communication method other than a Bluetooth communication method as a medium, security may be enhanced only with the channel hopping information and time stamp of data area of beacon packet.

When a communication connection signal is received from the first mobile device 2 in response to a successful communication connection attempt of the first mobile device 2, the first processor 124 may communicate with the first mobile device 2. When information transmitted from the first mobile device 2 is received, the first processor 124 controls an operation of at least one electronic device based on a control command in the received information and thus allows a function corresponding to the received information to be performed.

For example, when a door opening command is received from the communicatively connected first mobile device 2, the first processor 124 controls to unlock a door, and when a door closing command is received from the communicatively connected first mobile device 2, the first processor 124 controls to lock the door. Also, when a lamp ON command is received from the communicatively connected first mobile device 2, the first processor 124 controls to turn on a lamp.

When a vehicle ON command is received from the communicatively connected first mobile device 2, the first processor 124 may control to turn on an engine of the vehicle, and when a vehicle ON command is received through a start button in a state where the first mobile device 2 is communicatively connected, the first processor 124 may control to turn on the engine of the vehicle.

When a handle provided in a door is an automatically operated handle and a door opening command is received from the communicatively connected first mobile device 2, the first processor 124 may control to unlock the door and control the handle to be drawn out of the door, and when a door closing command is received from the communicatively connected first mobile device 2, the first processor 124 may control to lock the door and control the handle to be retracted.

When a connection signal is received from the first mobile device 2, the first processor 124 may compare identification information of registered first mobile device and identification information of the communicatively connected first mobile device 2 to determine whether the first mobile device 2 transmitting the connection signal is identical to the registered first mobile device 2.

When the identification information of the communicatively connected first mobile device 2 is identical to the identification information of the registered first mobile device 2, the first processor 124 may control at least one electronic device to perform an operation corresponding to the information received from the communicatively connected first mobile device 2.

In addition, when the identification information of the communicatively connected first mobile device 2 is different from the identification information of the registered first mobile device 2, the first processor 124 may refuse or withhold control of the at least one electronic device's operation corresponding to the information received from the communicatively connected first mobile device 2.

When a communication connection signal is received from the first mobile device 2, the first processor 124 may obtain distance information to the first mobile device 2 based on a transmission power in a beacon packet and reception signal strength of a signal transmitted from the first mobile device 2 and may determine whether a distance to the first mobile device 2 is less than or equal to a reference distance based on the obtained distance information and reference distance information. When it is determined that the distance to the first mobile device 2 is less than or equal to the reference distance, the first processor 124 may control an operation of the at least one electronic device based on the information transmitted from the first mobile device 2. When it is determined that distance to the first mobile device 2 is greater than the reference distance, the first processor 124 may refuse or withhold control of the at least one electronic device's operation corresponding to the information transmitted from the first mobile device 2.

When failing to control the at least one electronic device's operation corresponding to the information transmitted from the first mobile device 2, the first processor 124 may transmit operation control failure information to the first mobile device 2. Also, when the distance to the first mobile device 2 exceeds the reference distance, the first processor 124 may transmit information about exceeding the reference distance to the first mobile device 2.

The first processor 124 may be implemented as a single processor or include a separate processor for detecting a relay attack.

The first processor 124 may be a memory (not shown) that stores an algorithm for controlling operations of constituent components of the vehicle or data about a program that reproduces the algorithm and may be a processor (not shown) that performs the above-described operations using the data stored in the memory. In this instance, the memory and the processor may be provided as one chip or provided as separate chips.

The first memory 125 may store information about the preset period of time and the reference distance.

The first memory 125 stores identification information of the first mobile device, user registration information, and identification information of the vehicle.

The first memory 125 may be implemented with at least one of a volatile memory such as a random access memory (RAM), a non-volatile memory such as a cache, a flash memory, a read only memory (ROM), a programmable read only memory (PROM), an erasable programmable read only memory (EPROM), an electrically erasable programmable read only memory (EEPROM), etc., or a recording media such as a hard disk drive (HDD), or a compact disc read only memory (CD-ROM), without being limited thereto.

The first memory 125 and the first processor 124 may be integrated into one chip or provided in physically separated locations.

The vehicle start module 126 may include at least one of a drive motor applying a driving force to vehicle wheels or an engine. Here, the engine may operate a starting motor based on a command of the first processor 124 when starting, and stop the operation based on a vehicle OFF command of the first processor 124.

The locking member 127 may be provided to be connected to a plurality of doors, and lock or unlock the at least one door 111 based on a control command of the first processor 124.

The vehicle may further include a lamp driving part. In this case, when information corresponding to a lamp ON command is received from the authenticated first mobile device 2, the first processor 124 may control the lamp driving part to turn on the lamp.

At least one constituent component may be added or omitted corresponding to the performance of the constituent components of the vehicle illustrated in FIG. 2. Also, it should be easily understood by those having ordinary skill in the art that mutual positions of the constituent components may be modified corresponding to the performance or structure of the system.

Figure 7:
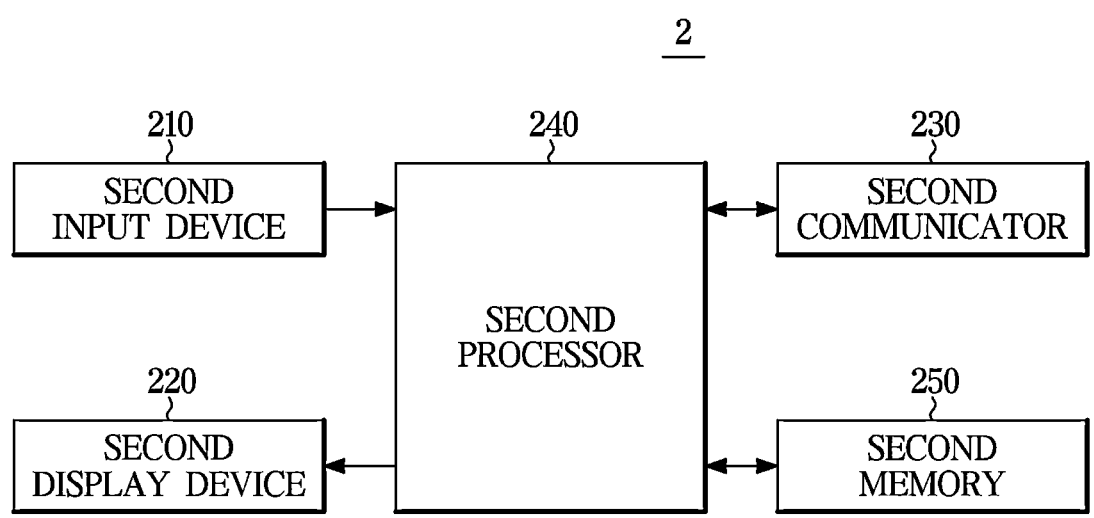
FIG. 7 is a block diagram illustrating a configuration of a first mobile device communicating with a vehicle according to an embodiment.

FIG. 7 is a block diagram illustrating a configuration of a first mobile device communicating with a vehicle according to an embodiment.

The first mobile device 2 includes a second input device 210, a second display device 220, a second communicator 230, a second processor 240, and a second memory 250.

The second input device 210 receives a user input. The second input device 210 receives a registration command and registration authentication information as a digital key. The second input device 210 receives a control command for controlling an operation of the vehicle.

The second input device 210 receives at least one of a communication connection attempt command with the vehicle, door lock and unlock commands, tailgate lock and unlock commands, a vehicle ON command, or a lamp ON command.

The second input device 210 may receive a download command, a setup command, a membership registration command, and an execution command of application.

The second input device 210 may receive an anti-theft release command during execution of the application.

The second input device 210 may be a button type pressed by a user, or a touch type touched by the user.

The second display device 220 may display information input to the second input device 210.

The second display device 220 may display information about registration processes of the first mobile device 2.

The second display device 220 may display communication connection success information or communication connection failure information based on a control command of the second processor 240.

Upon communication with the vehicle, the second display device 220 may display a plurality of buttons having a control command that may be transmitted to the vehicle.

For example, the second display device 220 may display operation performance information corresponding to the control command transmitted to the vehicle. For example, the second display device 220 may display door lock completion information or door lock failure information corresponding to a door lock command, display door unlock completion information or door unlock failure information corresponding to a door unlock command, display lamp on completion information or lamp on failure information corresponding to a lamp on command transmitted to the vehicle, or display a time left to turn off the lamp.

Here, the second input device 210 may include a touch panel, the second display device 220 may include a display panel, and the touch panel of the second input device 210 and the display panel of the second display device 220 may be integrally provided. In other words, the touch panel of the second input device 210 and the display panel of the second display device 220 may be implemented as a touch screen.

The second communicator 230 may include at least one constituent component enabling communication among external devices and constituent components of the first mobile device 2, for example, at least one of a short-range communication module, wireless communication module, or a wired communication module. Here, the external devices may be the vehicle 1 and the server 3.

The short-range communication module, wireless communication module, and wired communication module of the second communicator 230 may be similar or identical to those of the first communicator.

The second processor 240 may activate the second communicator 120 based on a registration command of the first mobile device 2 input through the second input device 210 and may transmit a registration consent command to the vehicle through the second input device 210.

The registration command of the first mobile device 2 may be a command for registering a digital key for controlling the vehicle, in the first mobile device.

When a beacon packet is received from the vehicle upon registration of the first mobile device in the vehicle, the second processor 240 may control the second memory 250 to store information about a proximity universal unique ID (UUID) field, a major field, and a minor field included in data in the received beacon packet.

When the first mobile device 2 is completely registered, the second processor 240 may also receive, from the vehicle 1, the information about the UUID field, the major field, and the minor field included in data in the received beacon packet and may control the second memory 250 to store the received information about the UUID field, the major field, and the minor field.

The second processor 240 may obtain a shared key and an encryption key based on the received information about the UUID field, the major field, and the minor field and may control the second memory 250 to store the obtained shared key and encryption key.

When parsing the beacon packet upon registration of the first mobile device in the vehicle and determining that the parsed beacon packet is the beacon packet transmitted by the vehicle, the second processor 240 may control the second display device 220 to display information about UUID, major, minor, and transmission power (TxPower) of a data field in the beacon packet.

When registration completion information of the first mobile device 2 is received from the vehicle, the second processor 240 may control the second memory 250 to store identification information of the vehicle. In other words, the first mobile device may store the vehicle 1 that has transmitted the beacon packet as the vehicle 1 to be controlled using a function of the digital key.

When performing a digital key function of the vehicle after completing registration of the first mobile device 2, the second processor 240 attempts communication connection with the vehicle 1 by activating the second communicator 230. The second processor 240 scans an advertising signal when attempting the communication connection with the vehicle 1.

When the advertising signal transmitted from the vehicle is received when scanning the advertising signal, the second processor 240 determines that a nearby vehicle exists and attempts communication connection with the vehicle.

When the advertising signal is received, the second processor 240 may obtain distance information to the vehicle 1 based on a reception signal strength and may determine whether a distance to the vehicle 1 is within a preset distance based on the obtained distance information and reference distance information.

When the advertising signal is received, the second processor 240 may initiate the communication connection again and may permit communication with the vehicle to be performed through the connection method.

When the advertising signal is received, the second processor 240 may confirm the UUID of the data field in the beacon packet stored in the second memory 250, may decrypt the received advertising signal using the confirmed UUID as an encryption key, and thus may obtain data.

When the advertising signal is received, the second processor 240 may confirm identification information of the vehicle and channel hopping information.

When the advertising signal is received, the second processor 240 may compare the received identification information of the vehicle and pre-stored identification information of the vehicle to determine whether the received identification information of the vehicle is identical to the pre-stored identification information of the vehicle. When it is determined that the received identification information of the vehicle is identical to the pre-stored identification information of the vehicle, the second processor 240 determines that the vehicle that has transmitted the advertising signal is the vehicle to be controlled through the first mobile device.

When it is determined that the vehicle that has transmitted the advertising signal is the vehicle to be controlled through the first mobile device, the second processor 240 may transmit a response signal through a channel corresponding to the confirmed channel hopping information. In this instance, the response signal may be an advertising signal, and information of the advertising signal may include a time stamp and identification information of the first mobile device.

The time stamp may be included in a data area of the beacon packet by the vehicle.

When it is determined that the received identification information of the vehicle is different from the pre-stored identification information of the vehicle, the second processor 240 does not determine that the vehicle that has transmitted the advertising signal is the vehicle to be controlled through the first mobile device.

When it is determined that the vehicle that has transmitted the advertising signal is the vehicle to be controlled through the first mobile device, the second processor 240 may connect to the vehicle through communication and may control the second display device 220 to display communication connection information with the vehicle.

When communication connection with the vehicle 1 has failed, the second processor 240 may control the second display device 220 to display communication connection failure information.

When a relay attack detection event is received from the vehicle through the server 3, the second processor 240 may control the second display device 220 to display the received relay attack detection event and may also control a speaker (not shown) provided in the first mobile device to output the received relay attack detection event.

When an application execution command is received through the second input device 210, the second processor 240 may control to execute an application and may control the second display device 220 to display an execution image of the application being executed.

When an anti-theft release command is received during execution of application through the second input device 210, the second processor 240 may transmit the anti-theft release command to the vehicle 1 through the server 3.

When anti-theft release completion information is received through the server 3, the second processor 240 may control the second display device 220 to display the received anti-theft release completion information.

The second processor 240 may transmit a user input received through the second input device 210 during execution of application, to the vehicle 1 through the server.

The second processor 240 may directly transmit, to the vehicle 1, a user input received through the second input device 210 during execution of application.

The user input received through the second input device 210 may include a vehicle ON/OFF command, a door lock/unlock command, and operation information of at least one electronic device provided in the vehicle. The at least one electronic device may include an audio device, an air conditioner, a steering wheel heater, a seat heater, a seat ventilation, and the like.

The second memory 250 stores information about the UUID field, the major field, and the minor field included in the data field in the beacon packet stored in the vehicle.

Here, the information about the beacon packet is for confirming whether a vehicle that attempts communication connection is a vehicle registered in the first mobile device, when attempting communication between the vehicle and the first mobile device after registration of the first mobile device.

In addition, the information about the beacon packet may be used to confirm whether a first mobile device that attempts communication connection is a registered first mobile device, when attempting communication between the vehicle and the first mobile device after registration of the first mobile device.

The second memory 250 may also store identification information of the vehicle, identification information of the first mobile device and identification information of user.

The second memory 250 may also store user registration information matching the vehicle.

At least one constituent component may be added or omitted corresponding to the performance of the constituent components of the first mobile device 2 illustrated in FIG. 7. Also, it should be easily understood by those having ordinary skill in the art that mutual positions of the constituent components may be modified corresponding to the performance or structure of the system.

Figure 8:
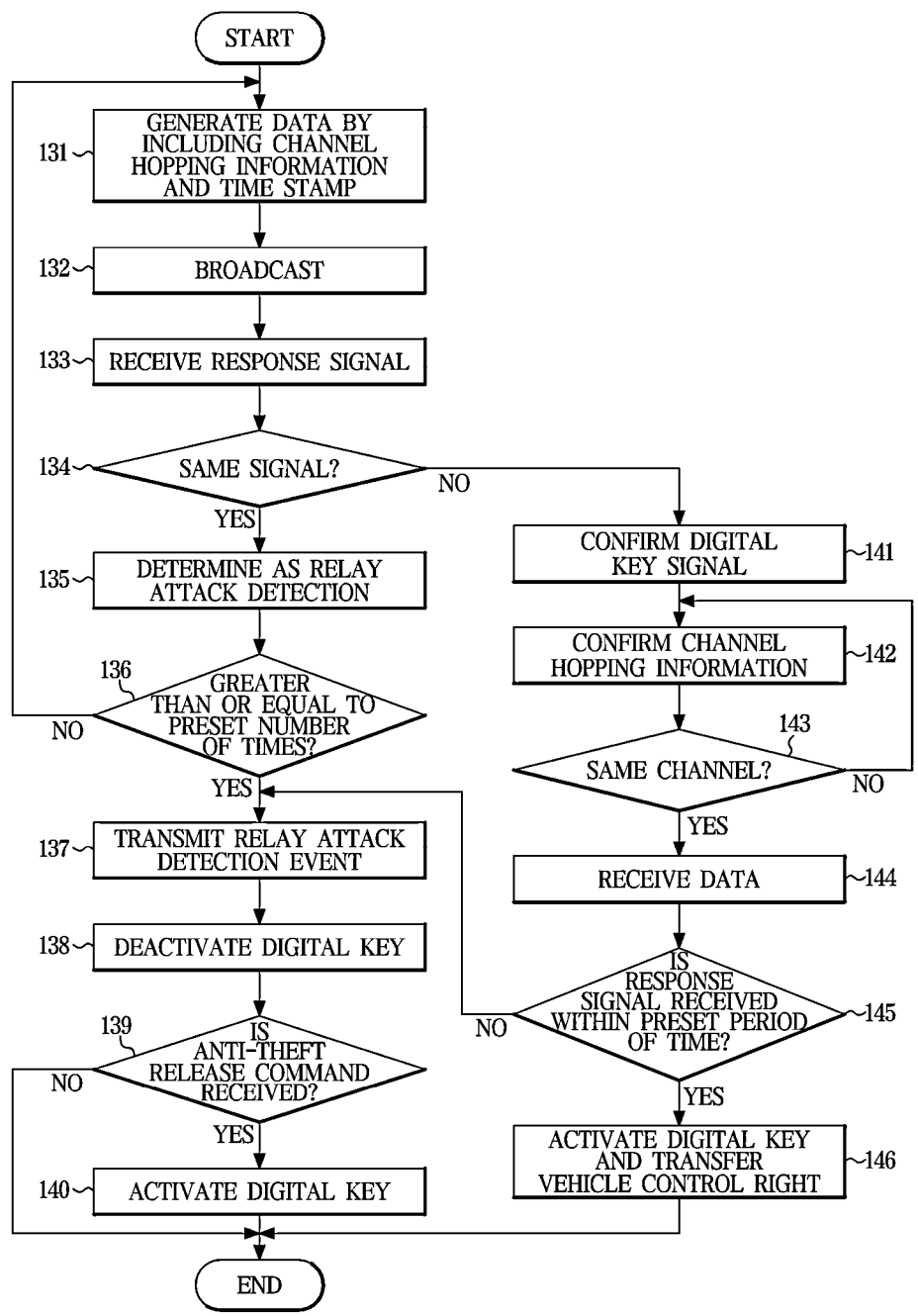
FIG. 8 is a flowchart illustrating operations of a control method of a vehicle according to an embodiment.

FIG. 8 is a flowchart illustrating operations of a control method of a vehicle according to an embodiment.

During registration of a first mobile device, a digital key may be automatically generated in the first mobile device, and the first mobile device may transmit the generated digital key to the vehicle 1.

The vehicle may also generate the digital key, once the first mobile device is registered, and the vehicle may transmit the generated digital key to the first mobile device.

The vehicle may store the digital key and may further store identification information of the registered first mobile device and user registration information.

The vehicle may scan nearby mobile devices, when the vehicle is in a stopped state, or after the vehicle is turned off.

The vehicle may broadcast an advertising signal to scan the nearby mobile devices.

Before broadcasting the advertising signal, the vehicle may generate data (in step 131) by recording channel hopping information and time stamp in a data area in a beacon packet and may broadcast the beacon packet including the generated data as the advertising signal (in step 132).

The vehicle may also generate data by further including signal count data and vehicle identification number (VIN) in the data area in the beacon packet.

In this instance, the generated data may be unique data.

When broadcasting the advertising signal, the vehicle may broadcast using only a predetermined channel. Here, the predetermined channel may include three channels, i.e., channel 37 (37 ch), channel 38 (38 ch), and channel 39 (39 ch).

The vehicle may periodically transmit an advertising signal.

The first and second mobile devices located around the vehicle may receive the advertising signal.

The first mobile device may be a mobile device owned by a vehicle user and in which the digital key is registered.

The first mobile device may ascertain channel hopping information, and thus the first mobile device may confirm a channel based on the channel hopping information and may transmit a response signal through the confirmed channel.

The second mobile device may be a mobile device of a hacker associated with relay attack.

Because the second mobile device may not ascertain the channel hopping information, the second mobile device may not transmit a response signal.

When the response signal is received (in step 133), the vehicle determines whether information of the received response signal is identical to information of the advertising signal transmitted by the vehicle (in step 134).

More specifically, when the information of response signal in the broadcasting method is received, the vehicle determines whether the received information of response signal in the broadcasting method is identical to information of the advertising signal in the broadcasting method transmitted from the vehicle, When it is determined that the received information of response signal in the broadcasting method is identical to the information of the advertising signal in the broadcasting method transmitted from the vehicle (Yes in step 135), the vehicle determines as a relay attack detection (in step 135).

When it is determined that the received information of response signal in the broadcasting method is identical to the information of the advertising signal in the broadcasting method transmitted from the vehicle, the vehicle confirms the number of times that the same information of response signal in the broadcasting method is received, and the vehicle determines whether the confirmed number of times is greater than or equal to a preset number of times N (in step 136).

At step 136, when it is determined that the confirmed number of times is greater than or equal to the preset number of times, the vehicle may determine as the relay attack detection. Here, the preset number of times may be three times.

When the relay attack detection is determined (Yes in step 136), the vehicle transmits a relay attack detection event to the first mobile device 2 through the server 3 (in step 137).

When the relay attack detection is determined, the vehicle may deactivate the digital key (in step 138) and thus may block a transfer of control right to control the vehicle using the digital key.

When receiving an anti-theft release command is received (Yes in step 139) through an application for anti-theft release installed in the first mobile device 2 after determining as the relay attack detection, the vehicle may activate the digital key (in step 140), may transfer the vehicle control right to the first mobile device 2, and thus may allow the vehicle to be controlled by using the first mobile device 2.

The vehicle may control operations of electronic devices inside the vehicle based on a command received from the first mobile device.

When it is determined that the received information of response signal in the broadcasting method is different from the information of the advertising signal in the broadcasting method transmitted from the vehicle (No in step 134), the vehicle confirms whether the information of response signal of the first mobile device includes information about a digital key signal (in step 141).

Comparing the received information of response signal in the broadcasting method and the information of the advertising signal in the broadcasting method transmitted from the vehicle may include comparing the received response signal in the broadcasting method and the advertising signal in the broadcasting method transmitted from the vehicle.

When the information about the digital key signal is included in the information of response signal, the vehicle confirms channel hopping information (in step 142).

The vehicle confirms a channel based on the confirmed channel hopping information.

The vehicle determines whether the confirmed channel is identical to a channel used when broadcasting (in step 143), and when it is determined that the confirmed channel is identical to the channel used when broadcasting (Yes in step 143), the vehicle may receive data transmitted from the first mobile device through the channel used when broadcasting (in step 144).

A data parsing protocol where security is applied between the vehicle and the first mobile device is required to receive data of the application.

Even though parsing the data of the beacon packet may be performed, the second mobile device requires approximately 30 msec from receiving the advertising signal to parsing, due to a structure of a Bluetooth protocol stack.

In addition, when a response signal is transmitted to the vehicle after parsing, the vehicle requires approximately 30 msec from receiving the response signal to parsing. In other words, upon communication with the second mobile device, the vehicle requires approximately 60 msec from receiving the response signal after transmission of the advertising signal to parsing.

When receiving the response signal from the first mobile device 2, the vehicle may confirm a time stamp to determine validity of data.

The vehicle determines whether the response signal is received within a preset period of time (in step 145), based on time information of the time stamp and time information about a time that the response signal is received. When it is determined that the response signal is received within the preset period of time (Yes in step 145), the vehicle controls activation of the digital key and transfers the vehicle control right to the first mobile device (in step 146).

When it is determined that the response signal is received after the preset period of time, the vehicle controls deactivation of the digital key.

Here, the preset period of time may be approximately 50 msec.

The vehicle determines whether the vehicle is communicatively connected to the first mobile device, and when it is determined that the vehicle is communicatively connected to the first mobile device, the vehicle may perform an operation corresponding to information received from the connected first mobile device.

In other words, when a communication connection signal is received from the first mobile device 2 in response to a successful communication connection attempt of the first mobile device 2, the vehicle may communicate with the first mobile device 2. When information transmitted from the first mobile device 2 is received, the vehicle controls an operation of at least one electronic device based on a control command in the received information and thus allows a function corresponding to the received information to be performed.

For example, when a door opening command is received from the communicatively connected first mobile device 2, the vehicle 1 controls to unlock a door, and when a door closing command is received from the communicatively connected first mobile device 2, the vehicle 1 controls to lock the door. Also, when a lamp ON command is received from the communicatively connected first mobile device 2, the vehicle controls to turn on a lamp.

When a vehicle ON command is received from the communicatively connected first mobile device 2, the vehicle may control to turn on an engine of the vehicle, and when a vehicle ON command is received through a start button in a state where the first mobile device 2 is communicatively connected, the vehicle may control to turn on the engine of the vehicle.

Meanwhile, the above-described embodiments can be stored in the form of a recording medium storing computer-executable instructions. The instructions may be stored in the form of a program code, and when executed by a processor, the instructions may perform operations of the disclosed embodiments. The recording medium may be implemented as a computer-readable recording medium.

The computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

As is apparent from the above, according to the embodiments of the disclosure, vehicle theft and theft of items inside the vehicle can be prevented based on indirect communication between the vehicle and a mobile device. In other words, vehicle theft and theft of items inside the vehicle caused by a relay station attack or relay attack can be prevented.

According to embodiments, vehicle security can be enhanced using only Bluetooth communication and a digital key service with improved security can be provided.

According to embodiments, costs for hardware or software related to digital key security can be reduced, because ultra-wideband (UWB) is not used. In other words, a variety of digital key services can be provided by a mobile device not equipped with ultra-wideband technology.

Through the above, a vehicle owner may use a digital key, even when using a low-cost mobile device.

According to embodiments, the vehicle can be controlled the same when using an existing remote controller without execution of application on a mobile device and user input, and thus use of convenience functions can be expanded.

According to embodiments, due to enhanced security of communication with a mobile device, a quality and marketability of the vehicle can be improved, and safety and competitiveness of the vehicle can be enhanced.

Although embodiments have been described for illustrative purposes, those having ordinary skill in the art should appreciate that various modifications, additions, and substitutions are possible, without departing from the scope and spirit of the disclosure. Therefore, embodiments have not been described for limiting purposes.

What is claimed is:

1. A vehicle comprising:
   a communicator configured to communicate with a mobile device storing a digital key;
   a memory configured to store identification information of the mobile device, identification information of the vehicle, and the digital key; and
   a processor configured to:
   broadcast a packet as an advertising signal through any one of a plurality of preset channels,
      in response to information of the advertising signal being identical to information of a response signal received through the communicator, determine as a relay attack detection and control deactivation of the digital key,
      in response to the information of the advertising signal being different from the information of the response signal received through the communicator, confirm a channel through which the information of the response signal is received, and
      in response to the confirmed channel being identical to the any one channel, control activation of the digital key.

2. The vehicle of claim 1, wherein the processor is configured to confirm a number of times that the information of the response signal identical to the information of the advertising signal is received, and
   wherein the processor is configured to, in response to the confirmed number of times being a preset number of times, determine as the relay attack detection.

3. The vehicle of claim 1, wherein the processor is configured to transmit a relay attack detection event to the mobile device, in response to determining as the relay attack detection.

4. The vehicle of claim 1, wherein the processor is configured to control the activation of the digital key, in response to receiving an anti-theft release command through an application of the mobile device, with the digital key deactivated.

5. The vehicle of claim 4, further comprising:
   at least one electronic device,
   wherein the processor is configured to control an operation of the at least one electronic device, based on a control command received through the mobile device, with the digital key activated.

6. The vehicle of claim 1, wherein the communicator is configured to transmit channel hopping information and a time stamp of a data area of the packet to the processor, before the broadcasting.

7. The vehicle of claim 6, wherein, in response to the confirmed channel being identical to the any one channel, the processor is configured to determine whether the information of the response signal is received within a preset period of time based on the time stamp, and
   wherein based on a determination that the information of the response signal is received within the preset period of time, the processor is configured to control the activation of the digital key.

8. The vehicle of claim 1, wherein the communicator is configured to transmit channel hopping information, a time stamp of a data area of the packet, signal count data, and the identification information of the vehicle to the processor, before the broadcasting.

9. A control method of a vehicle, the control method comprising:
   receiving channel hopping information and a time stamp of a data area of a packet from a communicator;
   broadcasting the packet as an advertising signal through any one of a plurality of preset channels;
   in response to information of the advertising signal being identical to information of a response signal of a mobile device received through the communicator, determining as a relay attack detection;
   controlling deactivation of a digital key in response to determining as the relay attack detection;
   in response to the information of the advertising signal being different from the information of the response signal of the mobile device, confirming a channel through which the information of the response signal is received; and
   in response to the confirmed channel being identical to the any one channel, controlling activation of the digital key.

10. The control method of claim 9, wherein the determining as the relay attack detection comprises:
    confirming a number of times that the information of the response signal identical to the information of the advertising signal is received, and
    in response to the confirmed number of times being a preset number of times, determining as the relay attack detection.

11. The control method of claim 9, further comprising:
    transmitting a relay attack detection event to the mobile device, in response to determining as the relay attack detection.

12. The control method of claim 9, further comprising:
in response to receiving an anti-theft release command through an application of the mobile device, with the digital key deactivated, controlling the activation of the digital key.

13. The control method of claim 12, further comprising:
controlling an operation of at least one electronic device based on a control command received through the mobile device, with the digital key activated.

14. The control method of claim 9, wherein the controlling of the activation of the digital key comprises:
in response to the confirmed channel being identical to the any one channel, determining whether the information of the response signal is received within a preset period of time based on the time stamp, and
based on a determination that the information of the response signal is received within the preset period of time, controlling the activation of the digital key.

15. The control method of claim 9, wherein signal count data of the data area of the packet and identification information of the vehicle are further received, before the broadcasting.

\* \* \* \* \*